Figures 1, 2, 3, 4:
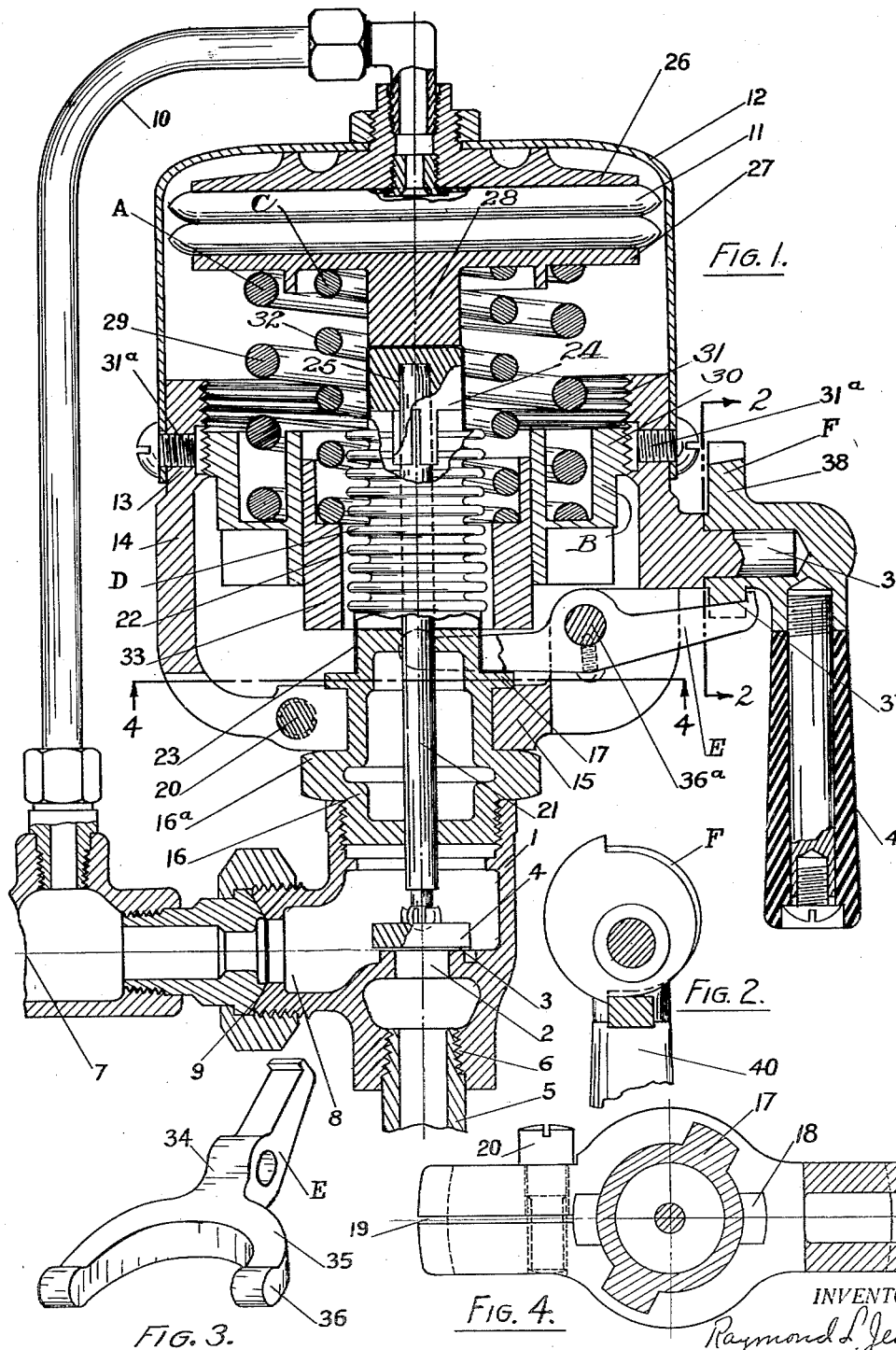

March 20, 1934.    R. L. JEWELL    1,951,829
PRESSURE CONTROL DEVICE
Filed Sept. 26, 1930

INVENTOR.
Raymond L. Jewell
BY
ATTORNEYS.

Patented Mar. 20, 1934

1,951,829

UNITED STATES PATENT OFFICE 1,951,829

PRESSURE CONTROL DEVICE

Raymond L. Jewell, Millcreek Township, Erie County, Pa., assignor to American Sterilizer Company, Erie, Pa., a corporation of Pennsylvania Application September 26, 1930, Serial No. 484,697

3 Claims. (Cl. 50—23)

One of the objects of the invention is to provide a pressure control device with a simple adjustment which may be readily made at intervals. As an example of a purpose of such a device is a device of this type used with sterilizers to control the steam pressure. In sterilizing certain articles, such as cloths a comparatively high steam pressure may be used and in sterilizing goods involving rubber a lower temperature is desirable because of the material involved. In as much as the same sterilizer is ordinarily used the usual adjustments for such devices are impractical and the present invention is designed to facilitate this adjustment. The invention also contemplates a convenient manner of mounting the pressure device so that it may be readily removed for servicing. Other features and details of the invention will appear from the specification and claims.

A preferred embodiment of the invention is illustrated in the accompanying drawing as follows:—

Fig. 1 shows a central section through the device.

Fig. 2 a side elevation of an adjusting cam and its operating handle.

Fig. 3 a perspective view of the adjusting lever.

Fig. 4 a section on the line 4—4 in Fig. 1.

1 marks a valve body, 2 a valve opening, 3 a valve seat around the opening, 4 a valve disc, and 5 a supply pipe leading to the inlet end 6 of the valve body. An outlet 7 leads from the discharge end 8 of the valve body and is connected therewith by a union joint 9.

A pipe 10 leads from the discharge pipe and is connected to a pressure chamber 11 of the bellows type. The pressure chamber is mounted in a cap 12 and the cap is mounted on a frame 13. The frame 13 has depending arms 14 terminating in an annular base 15. The base is arranged between shoulders 16a and 17 of a frame support 16, this frame support forming the ordinary bonnet of the valve. The shoulders 17 are of slight circumferential extent and the base 15 has grooves 18 through which the shoulders are adapted to pass, the parts, therefore, forming a bayonet joint by means of which the frame may be readily assembled on the support. One of the arms 14 is split at 19 and a clamping bolt 20 extends through the split portions of the arm clamping the base 15 on the support.

A valve stem 21 extends upwardly through a bellows 22 which is used for closing the opening to the valve body. The bellows has a lower extension 23 which is secured to the upper end of the support 16 and the upper end of the bellows is secured to a plug 24 having a socket 25 receiving the stem. The bellows 11 has a stationary plate 26 at one side and a movable head 27 at the opposite side, the movable head having a projection 28 engaging the plug 24. It will readily be seen, therefore, that the closing movement of the stem is responsive to and forced by the movement of the head 27. The opening movement of the stem is responsive to the pressure in the line on the valve 4.

A main spring 29 operates against the movable head 27 and is seated in an adjusting ring 30 having a screw-threaded connection 31 with the upper end of the frame 13. This is ordinarily adjusted with a normally permanent adjustment.

A second, or auxiliary spring 32 operates against the movable head 27 and is seated in a base ring 33, the base ring being arranged in the adjusting ring 30. A lever 34 has forks 35 with bearing ends 36 engaging the bottom of the base ring 33. The lever is pivotally mounted on a pin 36a and the outer end of the lever has a bearing surface 37 riding a cam 38. The cam is pivotally mounted on a stud 39 extending from the frame 13 and is provided with a handle 40 by means of which it may be quickly adjusted. The cam has sufficient throw so that operating through the lever it may put the spring 32 under full tension, or may relieve the head 24 entirely of the pressure from the spring 32.

In designing the structure ordinarily the spring 32 is made of such strength that by throwing it completely in, or out, the proper pressure is attained for the different articles desired. However the cam may be set in intermediate positions and thus accomplish a nice adjustment between these points.

It will be noted that the base ring is of sufficient size to be assembled over the bellows and the spring 32 is also of such size as to clear the bellows. When it is desired to remove the frame for servicing, the bolt 20 is loosened, the frame turned to bring the shoulders 17 into register with the opening, or groove 18 and the frame as a whole may be lifted off, the bellows remaining with the support and the support remaining with the valve. Thus it is possible without in any way disturbing the valve to lift the frame off of the valve. This permits of servicing the pressure mechanism by substituting another, or by substituting parts of the pressure device.

What I claim as new is:—

1. In a pressure control device, the combination of a valve; a stem for the valve; a chamber having a movable head; a frame carrying the chamber mounted on the valve; a bellows mounted on the valve acting with the stem as it moves in response to the movements of the head; a spring opposing the head surrounding the bellows; and means adjusting the spring, said frame with the spring and adjusting mechanism being removable from the valve and bellows with the bellows remaining in place on the valve.

2. In a pressure control device, the combination of a valve body; a frame support on the body; a pressure device frame mounted on the support connected therewith by a bayonet joint; a pressure chamber having a movable head; a main spring opposing the head, a base for the spring; an auxiliary spring opposing the movement of the head; a base ring for the auxiliary spring slidably mounted in the base of the main spring; a valve stem; and a bellows acting with the stem as it moves in response to movements of the head, said bellows being mounted on the support.

3. In a pressure control device, the combination of a valve body; a frame support on the body; a pressure device frame mounted on the support connected therewith by a bayonet joint; a pressure chamber having a movable head; a main spring opposing the head; a base for the spring; an auxiliary spring opposing the movement of the head; a base ring for the auxiliary spring slidably mounted in the base of the main spring; a valve stem; and a bellows acting with the stem as it moves in response to movements of the head, said bellows being mounted on the support, said frame being removable from the support leaving the bellows in place on the support.

RAYMOND L. JEWELL.